United States Patent
Nienhuys et al.

(10) Patent No.: US 12,164,125 B2
(45) Date of Patent: Dec. 10, 2024

(54) MANUFACTURING A REFLECTIVE DIFFRACTION GRATING

(71) Applicant: ASML Netherlands B.V., Veldhoven (NL)

(72) Inventors: Han-Kwang Nienhuys, Utrecht (NL); Sietse Thijmen Van Der Post, Utrecht (NL)

(73) Assignee: ASML NETHERLANDS B.V., Veldhoven (NL)

( * ) Notice: Subject to any disclaimer, the term of this patent is extended or adjusted under 35 U.S.C. 154(b) by 497 days.

(21) Appl. No.: 17/600,420

(22) PCT Filed: Mar. 6, 2020

(86) PCT No.: PCT/EP2020/056050
§ 371 (c)(1),
(2) Date: Sep. 30, 2021

(87) PCT Pub. No.: WO2020/200646
PCT Pub. Date: Oct. 8, 2020

(65) Prior Publication Data
US 2022/0221629 A1 Jul. 14, 2022

(30) Foreign Application Priority Data
Apr. 3, 2019 (EP) .................... 19167133

(51) Int. Cl.
*G02B 5/18* (2006.01)
(52) U.S. Cl.
CPC ......... *G02B 5/1847* (2013.01); *G02B 5/1861* (2013.01)
(58) Field of Classification Search
CPC ............ G02B 5/1847; G02B 5/1861
(Continued)

(56) References Cited

U.S. PATENT DOCUMENTS 5,363,238 A 11/1994 Akune et al.
6,952,253 B2 10/2005 Lof et al.
(Continued)

FOREIGN PATENT DOCUMENTS

CN 103424795 A 12/2013
CN 107179576 9/2017
(Continued)

OTHER PUBLICATIONS

Paul Lemaillet et al., "Intercomparison between Opticaland X-ray Scatterometry Measurements of Fin FET Structures," Proc. SPIE 8681, Metrology, Inspection, and Process Control for Microlithography XXVII, 86810Q, Apr. 2013, San Jose, CA, USA, 8 pages.

(Continued)

*Primary Examiner* — William R Alexander
(74) *Attorney, Agent, or Firm* — Sterne, Kessler, Goldstein & Fox P.L.L.C

(57) ABSTRACT

A grating is provided on a mirror for specularly reflecting and diffracting a grazing-incidence beam of radiation and has a periodic structure with a grating period comprising first (ridge) and second (trench) substructures either side of a sidewall 806 facing the incident beam 800. The ridge is configured to specularly reflect the beam from the flat top 808 of the ridge into a specularly reflected beam 810 in a zeroth-order direction $\beta'=\beta$. The grating is configured with fixed or varying pitch to diffract the beam from the grating periods in one or more non-zero-diffraction-order direction $\beta' \neq \beta$. The shape of the trench may be is described by structural parameters top width and depth that define the aspect ratio of the trench. The shape is determined such that any rays (and optionally diffraction) of the beam that reflect once from the trench floor in the zeroth-order direction are obscured by the sidewall.

14 Claims, 7 Drawing Sheets

(58) Field of Classification Search
USPC .......................................................... 359/566
See application file for complete search history.

(56) References Cited

U.S. PATENT DOCUMENTS

| | | |
|---|---|---|
| 7,003,075 B2 | 2/2006 | Miyake et al. |
| 10,900,832 B2* | 1/2021 | Sasai ..................... G01J 3/0208 |
| 2003/0161042 A1* | 8/2003 | Long ..................... G03H 1/041 |
| | | 359/566 |
| 2007/0224518 A1 | 9/2007 | Yokhin et al. |
| 2010/0328655 A1 | 12/2010 | Boef et al. |
| 2011/0026032 A1 | 2/2011 | Boef et al. |
| 2011/0102753 A1 | 5/2011 | Van de Kerkhof et al. |
| 2011/0249244 A1 | 10/2011 | Leewis et al. |
| 2012/0044470 A1 | 2/2012 | Smilde et al. |
| 2013/0170043 A1 | 7/2013 | Ko |
| 2013/0304424 A1 | 11/2013 | Bakeman et al. |
| 2014/0019097 A1 | 1/2014 | Bakeman et al. |
| 2015/0355394 A1 | 1/2015 | Valera et al. |
| 2016/0216103 A1 | 7/2016 | Speckbacher et al. |
| 2016/0282282 A1 | 9/2016 | Quintanilha et al. |
| 2017/0184981 A1 | 6/2017 | Quintanilha et al. |
| 2017/0336716 A1 | 11/2017 | Flagello et al. |
| 2017/0357155 A1 | 12/2017 | Quintanilha et al. |
| 2018/0051984 A1 | 2/2018 | Shchegrov et al. |
| 2018/0314164 A1* | 11/2018 | Dekkers ............... G02B 26/004 |
| 2020/0098486 A1* | 3/2020 | Coenen ............... G03F 7/70158 |

FOREIGN PATENT DOCUMENTS

| | | |
|---|---|---|
| EP | 1628164 A2 | 2/2006 |
| GB | 2509536 A | 7/2014 |
| JP | H05-257006 A | 10/1993 |
| JP | H08-271712 A | 10/1996 |
| JP | 2004-045267 A | 2/2004 |
| TW | 201326768 A | 7/2013 |
| WO | WO 2016/083120 A2 | 6/2016 |
| WO | WO 2016/083120 A3 | 7/2016 |
| WO | WO 2016/134892 A2 | 9/2016 |
| WO | WO 2016/134892 A3 | 10/2016 |

OTHER PUBLICATIONS

International Search Report and Written Opinion of the International Searching Authority, directed to related International Patent Application No. PCT/EP2020/056050, mailed Apr. 8, 2020; 10 pages.

International Preliminary Report on Patentability directed torelated International Patent Application No. PCT/EP2020/056050, issued Sep. 28, 2021; 8 pages.

* cited by examiner

MANUFACTURING A REFLECTIVE DIFFRACTION GRATING

CROSS REFERENCE TO RELATED APPLICATIONS

This application claims priority of EP application 19167133.8 which was filed on 2019 Apr. 3 and which is incorporated herein in its entirety by reference.

FIELD

The present invention relates to a method of manufacturing a reflective diffraction grating and an associated inspection apparatus, metrology apparatus and a lithographic apparatus.

BACKGROUND

A lithographic apparatus is a machine constructed to apply a desired pattern onto a substrate. A lithographic apparatus can be used, for example, in the manufacture of integrated circuits (ICs). A lithographic apparatus may, for example, project a pattern (also often referred to as "design layout" or "design") at a patterning device (e.g., a mask) onto a layer of radiation-sensitive material (resist) provided on a substrate (e.g., a wafer).

To project a pattern on a substrate a lithographic apparatus may use electromagnetic radiation. The wavelength of this radiation determines the minimum size of features which can be formed on the substrate. Typical wavelengths currently in use are 365 nm (i-line), 248 nm, 193 nm and 13.5 nm. A lithographic apparatus, which uses extreme ultraviolet (EUV) radiation, having a wavelength within the range 4-20 nm, for example 6.7 nm or 13.5 nm, may be used to form smaller features on a substrate than a lithographic apparatus which uses, for example, radiation with a wavelength of 193 nm.

In lithographic processes, it is desirable to make frequently measurements of the structures created, e.g., for process control and verification. Various tools for making such measurements are known, including scanning electron microscopes or various forms of metrology apparatuses, such as scatterometers. Examples of known scatterometers often rely on provision of dedicated metrology targets, such as underfilled targets (a target, in the form of a simple grating or overlapping gratings in different layers, that is large enough that a measurement beam generates a spot that is smaller than the grating) or overfilled targets (whereby the illumination spot partially or completely contains the target). Further, the use of metrology tools, for example an angular resolved scatterometer illuminating an underfilled target, such as a grating, allows the use of so-called reconstruction methods where the properties of the grating can be calculated by simulating interaction of scattered radiation with a mathematical model of the target structure and comparing the simulation results with those of a measurement. Parameters of the model are adjusted until the simulated interaction produces a diffraction pattern similar to that observed from the real target.

Scatterometers are versatile instruments which allow measurements of the parameters of a lithographic process by having a sensor in the pupil or a conjugate plane with the pupil of the objective of the scatterometer, measurements usually referred as pupil based measurements, or by having the sensor in the image plane or a plane conjugate with the image plane, in which case the measurements are usually referred as image or field based measurements. Such scatterometers and the associated measurement techniques are further described in patent applications US20100328655, US2011102753A1, US20120044470A, US20110249244, US20110026032 or EP1,628,164A, incorporated herein by reference in their entirety. Aforementioned scatterometers can measure in one image multiple targets from from multiple gratings using light from soft x-ray and visible to near-IR wave range.

As an alternative to optical metrology methods, it has also been considered to use X-rays, including hard X-rays (HXR), and soft X-rays (SXR), or EUV radiation (all of the three may be mentioned together as SXR in following text of this invention for concision reason), for example radiation in a wavelength range between 0.01 nm and 100 nm, or optionally between 1 nm and 100 nm, or optionally between 1 nm and 50 nm, or optionally between 10 nm and 20 nm. One example of metrology tool functioning in one of the above presented wavelength ranges is transmissive small angle X-ray scattering (T-SAXS as in US 2007224518A which content is incorporated herein by reference in its entirety). Profile (CD) measurements using T-SAXS are discussed by Lemaillet et al in "Intercomparison between optical and X-ray scatterometry measurements of FinFET structures", Proc. of SPIE, 2013, 8681. Reflectometry techniques using X-rays (GI-XRS) and extreme ultraviolet (EUV) radiation at grazing incidence are known for measuring properties of films and stacks of layers on a substrate. Within the general field of reflectometry, goniometric and/or spectroscopic techniques can be applied. In goniometry, the variation of a reflected beam with different incidence angles is measured. Spectroscopic reflectometry, on the other hand, measures the spectrum of wavelengths reflected at a given angle (using broadband radiation). For example, EUV reflectometry has been used for inspection of mask blanks, prior to manufacture of reticles (patterning devices) for use in EUV lithography.

It is possible that the range of application makes the use of wavelengths in the soft X-rays or EUV domain not sufficient. Therefore, published patent applications US 20130304424A1 and US2014019097A1 (Bakeman et al/KLA) describe hybrid metrology techniques in which measurements made using x-rays and optical measurements with wavelengths in the range 120 nm and 2000 nm are combined together to obtain a measurement of a parameter such as CD. A CD measurement is obtained by coupling and x-ray mathematical model and an optical mathematical model through one or more common. The content of the cited US patent applications are incorporated herein by reference in their entirety.

Conventional mirrors for HXR, SXR and EUV with grating patterns on their surface are typically optimized to diffract a relatively large fraction (tens of percents) of the incident radiation; the specularly reflected portion of the light is typically less important.

SUMMARY

For SXR or EUV metrology, only a small fraction of the specularly reflected should arrive outside the target. This can be translated into a roughness specification for a mirror. Given a fraction of total integrated scatter (TIS) as a requirement, the requirement on root mean square surface error ($z_{RMS}$) is given by $$z_{RMS} < \frac{\lambda}{4\pi \sin\beta} \sqrt{TIS}$$

where β is the grazing angle of incidence and λ is the wavelength. For example, at λ=15 nm, β=10 deg, and TIS=0.1%, the requirement is $z_{RMS}$<0.2 nm. This is a simple calculation of surface requirements. More sophisticated models may be used.

It is desirable that the mirror-with-diffraction grating produces as little stray light (scattered light) as possible, outside well-defined diffraction orders (including the zeroth order or specular reflection). Roughness specifications for mirrors cannot easily be translated to grating requirements. Conventionally, grating manufacturers have not had design and manufacture methods that can achieve the lowest possible stray light around the zeroth order.

According to a first aspect of the present invention, there is provided a method of manufacturing a reflective diffraction grating for specularly reflecting and diffracting a grazing-incidence beam of radiation incident on the grating, the grating having a periodic structure with a grating period comprising first and second substructures either side of a sidewall facing the incident beam, the method comprising the steps:

determining a configuration of the first substructure to specularly reflect the beam, incident at a grazing angle of incidence, with respect to the grating's direction of periodicity, on grating periods including a second substructure, from the first substructure into a specularly reflected beam in a zeroth-order direction;

determining a fixed or varying pitch configuration of grating periods including the second substructure to diffract the beam from the grating periods in one or more non-zero-diffraction-order direction;

determining, based on the grazing angle of incidence, a configuration of the second substructure and a sidewall of its grating period such that any rays of the beam that reflect once from the second substructure into the zeroth-order direction are obscured by the sidewall; and manufacturing the grating using the determined configurations of the first and second substructures and sidewall.

Preferably, the step of determining the configuration of the second substructure and the sidewall comprises determining, using a wavelength of the incident beam and a pitch of the grating periods including the second substructure, a configuration such that any rays of the beam that diffract from the second substructure into a selected non-zero-diffraction-order direction are obscured by the sidewall. This has the effect of eliminating the contribution of stray light to a measured diffraction spectrum. This makes the spectrum measurement more accurate.

Preferably, the step of manufacturing the grating comprises fabricating the grating on a mirror surface. This has the effect of providing efficient specular reflection, which is useful for metrology applications.

Preferably, the mirror surface is curved. This allows the focusing of the specularly reflected beam onto a target, which is useful for metrology applications.

Preferably, the first substructure comprises a ridge and the second substructure comprises a trench. These are convenient structures to manufacture.

Preferably, the ridge comprises a flat top and the trench comprises a flat floor parallel to the flat top of the ridge. The flat top of the ridge provides efficient specular reflection, which is useful for metrology applications. The flat floor is a convenient structure to manufacture using conventional lithographic processes.

Preferably the step of determining a configuration of the second substructure and the sidewall comprises determining a shape of the trench. The shape is something that can be conveniently controlled by choices in the manufacturing process.

Preferably, the step of determining a configuration of the second substructure and the sidewall comprises determining one or more structural parameters defining an aspect ratio of the trench. An aspect ratio is a useful way to specify the design of a trench.

Preferably, determining one or more structural parameters defining an aspect ratio of the trench comprises satisfying the inequality $$D > \frac{W}{\frac{1}{\tan\beta} + \frac{1}{\tan\beta'}}$$

where D is depth of the trench, W is top width of the trench, β is the grazing angle of incidence and β' is the zeroth-order direction or a non-zero-diffraction-order direction. This simple geometric rule is easy to use and it is surprisingly effective at improving the scattering performance on the specular reflectance of the grating so that not too much stray light arrives outside the target.

Preferably, the grating has a varying top width of the trench, and the depth of the trench is selected to satisfy the inequality for a largest top width of the varying top width. This has the effect that specular scattering performance is ensured for all top widths across the grating.

Preferably, the grating has a varying top width of the trench and the depth of the trench is varied to satisfy the inequality in correspondence with the varying width. This has the effect that specular scattering performance is ensured for all top widths across the grating, without requiring the narrowest trenches to be too deep, which may be hard to manufacture.

Preferably, the grating periods are configured with a grating pitch over trench width ratio of over 0.5, more preferably over 0.7, most preferably over 0.9. These increasing ratios progressively provide more specularly reflected light onto the target, which is useful for metrology.

Preferably, the grating periods are configured to specularly reflect a majority of the specularly reflected and diffracted radiation, more preferably over 70%, most preferably over 90%. These increasing percentages progressively provide more specularly reflected light onto the target, which is useful for metrology.

Preferably, the radiation has a wavelength in the range 1 nm to 100 nm, or in the range 10 nm to 20 nm. These are useful ranges of wavelength for metrology applications, particularly in EUV semiconductor manufacturing.

Preferably, the grazing angle of incidence is in the range 1 degree to 17 degrees, more preferably in the range 3 degrees to 5 degrees.

According to a second aspect of the present invention there is provided a reflective diffraction grating for specularly reflecting and diffracting a grazing-incidence beam of radiation incident on the grating, the grating having a periodic structure with a grating period comprising first and second substructures either side of a sidewall facing the incident beam, the grating comprising:

a first substructure configured to specularly reflect the beam, incident at a grazing angle of incidence, with respect to the grating's direction of periodicity, on grating periods including a second substructure, from the first substructure into a specularly reflected beam in a zeroth-order direction and grating periods including the second substructure configured with fixed or varying pitch to diffract the beam from the grating periods in one or more non-zero-diffraction-order direction, wherein the second substructure and a sidewall are configured such that any rays of the beam that reflect once from the second substructure in the zeroth-order direction are obscured by the sidewall and wherein the grating periods are configured to specularly reflect a majority of the specularly reflected and diffracted radiation.

According to a third aspect of the present invention, there is provided an inspection apparatus comprising:

a radiation source operable to provide a beam of radiation for illumination of a target;

a reflective diffraction grating according to the second aspect, arranged to receive the beam of radiation;

a target support for supporting the target arranged to receive the specularly reflected beam; and a detector arranged to receive a diffracted beam diffracted from the grating periods.

According to a fourth aspect of the present invention, there is provided a metrology apparatus comprising the inspection apparatus of the third aspect.

According to a fifth aspect of the present invention, there is provided a lithographic apparatus comprising the inspection apparatus of the third aspect.

BRIEF DESCRIPTION OF THE DRAWINGS

Embodiments of the invention will now be described, by way of example only, with reference to the accompanying schematic drawings, in which.

DETAILED DESCRIPTION

In the present document, the terms "radiation" and "beam" are used to encompass all types of electromagnetic radiation, including ultraviolet radiation (e.g. with a wavelength of 365, 248, 193, 157 or 126 nm), EUV and X-rays including hard X-rays (HXR) and soft X-rays (SXR) (e.g. in a wavelength range between 0.01 nm and 50 nm or optionally 1 nm and 100 nm or optionally between 1 nm and 50 nm or optionally between 10 nm and 20 nm).

Figure 1:
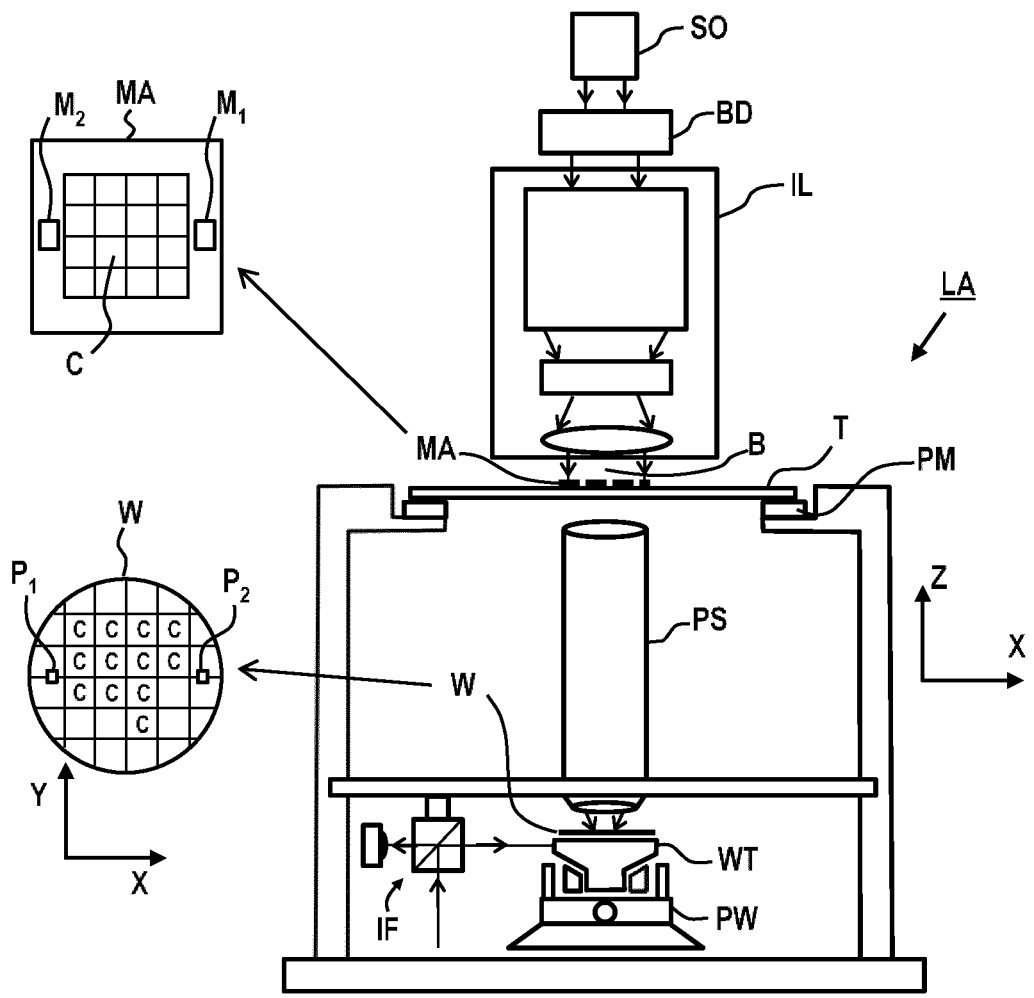
FIG. 1 depicts a schematic overview of a lithographic apparatus.

FIG. 1 schematically depicts a lithographic apparatus LA. The lithographic apparatus LA includes an illumination system (also referred to as illuminator) IL configured to condition a radiation beam B (e.g., UV radiation, DUV radiation or EUV radiation), a mask support (e.g., a mask table) MT constructed to support a patterning device (e.g., a mask) MA and connected to a first positioner PM configured to accurately position the patterning device MA in accordance with certain parameters, a substrate support (e.g., a wafer table) WT constructed to hold a substrate (e.g., a resist coated wafer) W and connected to a second positioner PW configured to accurately position the substrate support in accordance with certain parameters, and a projection system (e.g., a refractive projection lens system) PS configured to project a pattern imparted to the radiation beam B by patterning device MA onto a target portion C (e.g., comprising one or more dies) of the substrate W.

In operation, the illumination system IL receives a radiation beam from a radiation source SO, e.g. via a beam delivery system BD. The illumination system IL may include various types of optical components, such as refractive, reflective, magnetic, electromagnetic, electrostatic, and/or other types of optical components, or any combination thereof, for directing, shaping, and/or controlling radiation. The illuminator IL may be used to condition the radiation beam B to have a desired spatial and angular intensity distribution in its cross section at a plane of the patterning device MA.

The term "projection system" PS used herein should be broadly interpreted as encompassing various types of projection system, including refractive, reflective, catadioptric, anamorphic, magnetic, electromagnetic and/or electrostatic optical systems, or any combination thereof, as appropriate for the exposure radiation being used, and/or for other factors such as the use of an immersion liquid or the use of a vacuum. Any use of the term "projection lens" herein may be considered as synonymous with the more general term "projection system" PS.

The lithographic apparatus LA may be of a type wherein at least a portion of the substrate may be covered by a liquid having a relatively high refractive index, e.g., water, so as to fill a space between the projection system PS and the substrate W—which is also referred to as immersion lithography. More information on immersion techniques is given in U.S. Pat. No. 6,952,253, which is incorporated herein by reference.

The lithographic apparatus LA may also be of a type having two or more substrate supports WT (also named "dual stage"). In such "multiple stage" machine, the substrate supports WT may be used in parallel, and/or steps in preparation of a subsequent exposure of the substrate W may be carried out on the substrate W located on one of the substrate support WT while another substrate W on the other substrate support WT is being used for exposing a pattern on the other substrate W.

In addition to the substrate support WT, the lithographic apparatus LA may comprise a measurement stage. The measurement stage is arranged to hold a sensor and/or a cleaning device. The sensor may be arranged to measure a property of the projection system PS or a property of the radiation beam B. The measurement stage may hold multiple sensors. The cleaning device may be arranged to clean part of the lithographic apparatus, for example a part of the projection system PS or a part of a system that provides the immersion liquid. The measurement stage may move beneath the projection system PS when the substrate support WT is away from the projection system PS.

In operation, the radiation beam B is incident on the patterning device, e.g. mask, MA which is held on the mask support MT, and is patterned by the pattern (design layout) present on patterning device MA. Having traversed the mask MA, the radiation beam B passes through the projection system PS, which focuses the beam onto a target portion C of the substrate W. With the aid of the second positioner PW and a position measurement system IF, the substrate support WT can be moved accurately, e.g., so as to position different target portions C in the path of the radiation beam B at a focused and aligned position. Similarly, the first positioner PM and possibly another position sensor (which is not explicitly depicted in FIG. 1) may be used to accurately position the patterning device MA with respect to the path of the radiation beam B. Patterning device MA and substrate W may be aligned using mask alignment marks M1, M2 and substrate alignment marks P1, P2. Although the substrate alignment marks P1, P2 as illustrated occupy dedicated target portions, they may be located in spaces between target portions. Substrate alignment marks P1, P2 are known as scribe-lane alignment marks when these are located between the target portions C.

In order for the substrates W exposed by the lithographic apparatus LA to be exposed correctly and consistently, it is desirable to inspect substrates to measure properties of patterned structures, such as overlay errors between subsequent layers, line thicknesses, critical dimensions (CD), etc. For this purpose, inspection tools (not shown) may be used. If errors are detected, adjustments, for example, may be made to exposures of subsequent substrates or to other processing steps that are to be performed on the substrates W, especially if the inspection is done before other substrates W of the same batch or lot are still to be exposed or processed.

An inspection apparatus, which may also be referred to as a metrology apparatus, is used to determine properties of the substrates W, and in particular, how properties of different substrates W vary or how properties associated with different layers of the same substrate W vary from layer to layer. The inspection apparatus may alternatively be constructed to identify defects on the substrate W and may, for example, be part of a lithocell (not shown), or may be integrated into the lithographic apparatus LA, or may even be a stand-alone device. The inspection apparatus may measure the properties on a latent image (image in a resist layer after the exposure), or on a semi-latent image (image in a resist layer after a post-exposure bake step PEB), or on a developed resist image (in which the exposed or unexposed parts of the resist have been removed), or even on an etched image (after a pattern transfer step such as etching).

Figure 2:
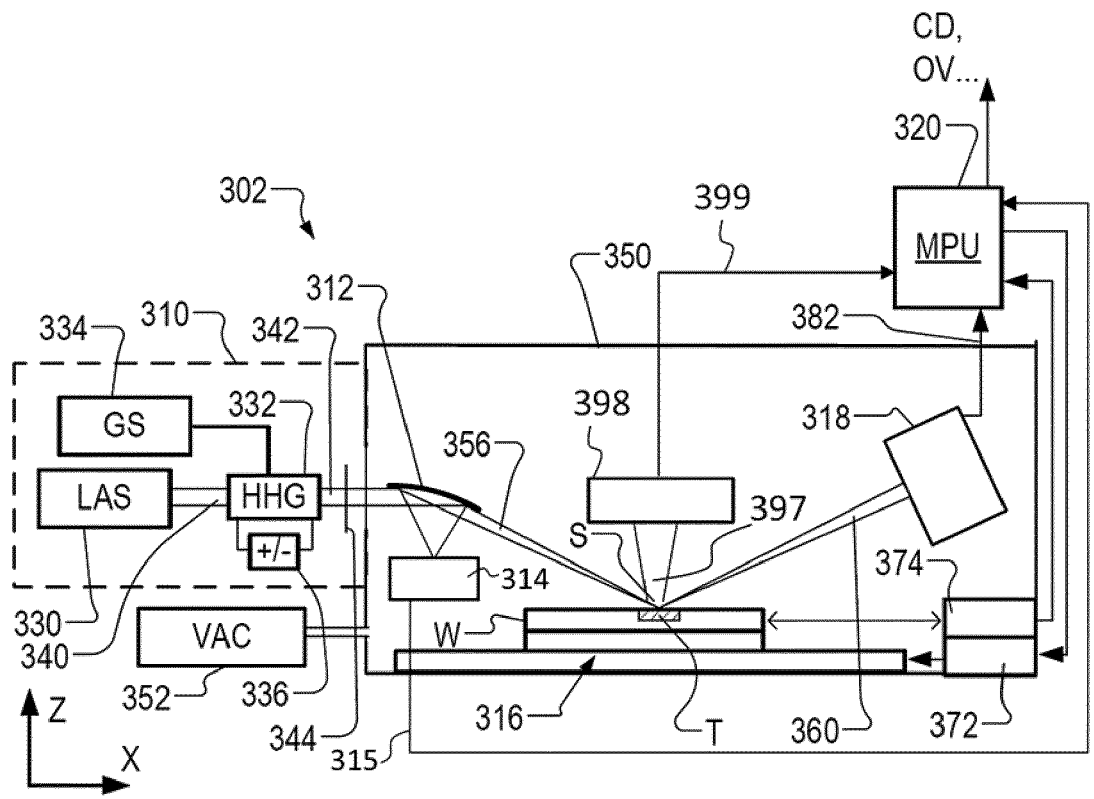
FIG. 2 depicts a schematic representation of a metrology apparatus 302 in which embodiments of the present invention may be implemented.

FIG. 2 illustrates a schematic physical arrangement of a metrology apparatus 302 comprising a spectroscopic scatterometer using EUV and/or X-rays radiation in grazing incidence, in which embodiments of the present invention may be implemented, purely by way of example.

Inspection apparatus 302 comprises a radiation source 310, illumination system 312, substrate support 316, detection systems 318, 398 and metrology processing unit (MPU) 320.

Source 310 in this example comprises a generator of EUV or soft x-ray radiation based on high harmonic generation (HHG) techniques. Such sources are available for example from KMLabs, Boulder Colorado., USA (http://www.kmlabs.com/). Main components of the radiation source are a drive laser 330 and an HHG gas cell 332. A gas supply 334 supplies suitable gas to the gas cell, where it is optionally ionized by an electric source 336. The drive laser 300 may be, for example, a fiber-based laser with an optical amplifier, producing pulses of infrared radiation that may last for example less than 1 ns (1 nanosecond) per pulse, with a pulse repetition rate up to several megahertz, as required. The wavelength of the infrared radiation may be for example in the region of 1 μm (1 micron). The laser pulses are delivered as a beam of first radiation 340 to the HHG gas cell 332, where in the gas a portion of the radiation is converted to higher frequencies than the first radiation into a beam 342 including coherent second radiation of the desired wavelength or wavelengths.

The second radiation may contain multiple wavelengths. If the radiation were monochromatic, then measurement calculations (for example reconstruction) may be simplified, but it is easier with HHG to produce radiation with several wavelengths. The volume of gas within the gas cell 332 defines an HHG space, although the space need not be completely enclosed and a flow of gas may be used instead of a static volume. The gas may be for example a noble gas such as neon (Ne) or argon (Ar). N2, O2, He, Ar, Kr, Xe gases can all be considered. These are matters of design choice, and may even be selectable options within the same apparatus. Different wavelengths will, for example, provide different levels of contrast when imaging structure of different materials. For inspection of metal structures or silicon structures, for example, different wavelengths may be selected to those used for imaging features of (carbon-based) resist, or for detecting contamination of such different materials. One or more filtering devices 344 may be provided. For example, a filter such as a thin membrane of Aluminum (Al) may serve to cut the fundamental IR radiation from passing further into the inspection apparatus. A grating (not shown) may be provided to select one or more specific harmonic wavelengths from among those generated in the gas cell. Some or all of the beam path may be contained within a vacuum environment, bearing in mind that SXR/EUV radiation is absorbed when traveling in air. The various components of radiation source 310 and illumination optics 312 can be adjustable to implement different metrology 'recipes' within the same apparatus. For example, different wavelengths and/or polarization can be made selectable.

Depending on the materials of the structure under inspection, different wavelengths may offer a desired level of penetration into lower layers. For resolving the smallest device features and defects among the smallest device features, then a short wavelength is likely to be preferred. For example, one or more wavelengths in the range 1-20 nm or optionally in the range 1-10 nm or optionally in the range 10-20 nm may be chosen. Wavelengths shorter than 5 nm suffer from very low critical angle when reflecting off materials typically of interest in semiconductor manufacture. Therefore, to choose a wavelength greater than 5 nm will provide stronger signals at higher angles of incidence. On the other hand, if the inspection task is for detecting the presence of a certain material, for example to detect contamination, then wavelengths up to 50 nm could be useful.

From the radiation source 310, the filtered beam 342 enters an inspection chamber 350 where the substrate W including a structure of interest (also known as a target) is held for inspection at a measurement position by substrate support 316. The structure of interest is labeled T. The atmosphere within inspection chamber 350 is maintained near vacuum by vacuum pump 352, so that EUV radiation can pass with-out undue attenuation through the atmosphere. The Illumination system 312 has the function of focusing the radiation into a focused beam 356, and may comprise for example a two-dimensionally curved mirror, or a series of one-dimensionally curved mirrors, as described in published US patent application US2017/0184981A1 (which content is incorporated herein by reference in its entirety), mentioned above. The focusing is performed to achieve a round or elliptical spot S under 10 µm in diameter, when projected onto the structure of interest. Substrate support 316 comprises for example an X-Y translation stage and a rotation stage, by which any part of the substrate W can be brought to the focal point of beam to in a desired orientation. Thus the radiation spot S is formed on the structure of interest. Alternatively, or additionally, substrate support 316 comprises for example a tilting stage that may tilt the substrate W at a certain angle to control the angle of incidence of the focused beam on the structure of interest T.

Optionally, the illumination system 312 provides a reference beam of radiation to a reference detector 314 which may be configured to measure a spectrum and/or intensities of different wavelengths in the filtered beam 342. The reference detector 314 may be configured to generate a signal 315 that is provided to processor 310 and the filter may comprise information about the spectrum of the filtered beam 342 and/or the intensities of the different wavelengths in the filtered beam.

Reflected radiation 360 is captured by detector 318 and a spectrum is provided to processor 320 for use in calculating a property of the target structure T. The illumination system 312 and detection system 318 thus form an inspection apparatus. This inspection apparatus may comprise a soft X-ray and/or EUV spectroscopic reflectometer of the kind described in US2016282282A1 which content is incorporated herein by reference in is entirety.

If the target T has a certain periodicity, the radiation of the focussed beam 356 may be partially diffracted as well. The diffracted radiation 397 follows another path at well-defined angles with respect to the angle of incidence then the reflected radiation 360. In FIG. 2, the drawn diffracted radiation 397 is drawn in a schematic manner and diffracted radiation 397 may follow many other paths than the drawn paths. The inspection apparatus 302 may also comprise further detection systems 398 that detect and/or image at least a portion of the diffracted radiation 397. In FIG. 2 a single further detection system 398 is drawn, but embodiments of the inspection apparatus 302 may also comprise more than one further detection system 398 that are arranged at different position to detect and/or image diffracted radiation 397 at a plurality of diffraction directions. In other words, the (higher) diffraction orders of the focussed radiation beam that impinges on the target T are detected and/or imaged by one or more further detection systems 398. The one or more detection systems 398 generates a signal 399 that is provided to the metrology processor 320. The signal 399 may include information of the diffracted light 397 and/or may include images obtained from the diffracted light 397.

To aid the alignment and focusing of the spot S with desired product structures, inspection apparatus 302 may also provide auxiliary optics using auxiliary radiation under control of metrology processor 320. Metrology processor 320 can also communicate with a position controller 372 which operates the translation stage, rotation and/or tilting stages. Processor 320 receives highly accurate feedback on the position and orientation of the substrate, via sensors. Sensors 374 may include interferometers, for example, which can give accuracy in the region of picometers. In the operation of the inspection apparatus 302, spectrum data 382 captured by detection system 318 is delivered to metrology processing unit 320.

As mentioned, an alternative form of inspection apparatus uses soft X-ray and/or EUV radiation at normal incidence or near-normal incidence, for example to perform diffraction-based measurements of asymmetry. Both types of inspection apparatus could be provided in a hybrid metrology system. Performance parameters to be measured can include overlay (OVL), critical dimension (CD), coherent diffraction imaging (CDI) and at-resolution overlay (ARO) metrology. The soft X-ray and/or EUV radiation may for example have wavelengths less than 100 nm, for example using radiation in the range 5-30 nm, of optionally in the range from 10 nm to 20 nm. The radiation may be narrowband or broadband in character. The radiation may have discrete peaks in a specific wavelength band or may have a more continuous character.

Like the optical scatterometer used in today's production facilities, the inspection apparatus 302 can be used to measure structures within the resist material treated within the litho cell (After Develop Inspection or ADI), and/or to measure structures after they have been formed in harder material (After Etch Inspection or AEI). For example, substrates may be inspected using the inspection apparatus 302 after they have been processed by a developing apparatus, etching apparatus, annealing apparatus and/or other apparatus.

Figure 3:
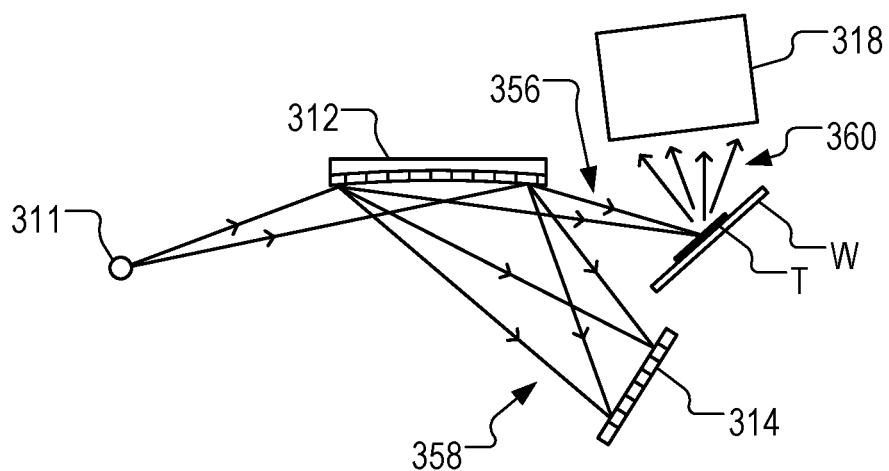
FIG. 3 depicts a schematic representation of radiation path in a metrology apparatus in accordance with an embodiment of the present invention.

FIG. 3 depicts a schematic representation of radiation path in a metrology apparatus. In the example metrology apparatus depicted in FIGS. 2 and 3, radiation from a nearly diffraction-limited source 311 is focused onto a target T on a wafer W. The target is typically a finite-size area on a wafer (e.g. 50 µm×50 µm or 5 µm×5 µm). Length scales of grating/mirror nonuniformity of interest (e.g., >1 µm) depend on target size and length of the light path from grating to target. The radiation has a wavelength in the range 1 nm to 100 nm, preferably in the soft X-ray (SXR) range 10 nm to 20 nm, which may also be described as being part of the EUV range. For accurate metrology, the following points are (among others) important:

Not too much SXR light should arrive outside the target, for example a fraction <0.05, <0.01, or <0.001 from the incident power.

The spectrum of the SXR radiation 356 incident on the target T can be measured, preferably simultaneously with the exposure of the target.

A grazing-incidence (GI) mirror 312 focuses an SXR beam onto a target T. Radiation 360 scattered from the target is captured by detector 318. A line pattern (grating) on the surface of the mirror diffracts a fraction 358 of the SXR radiation towards an array sensor 314, with different wavelength components arriving at different points on the array sensor. The signal from the array sensor can be interpreted as a spectrum.

For SXR or EUV metrology, only a small fraction of the specularly reflected should arrive outside the target. This can be translated into a roughness specification for a mirror. Given a fraction of total integrated scatter (TIS) as a requirement, the requirement on root mean square surface error ($z_{RMS}$) is given by $$z_{RMS} < \frac{\lambda}{4\pi \sin\beta} \sqrt{TIS}$$

where $\beta$ is the grazing angle of incidence and $\lambda$ is the wavelength. For example, at $\lambda=15$ nm, $\beta=10$ deg, and TIS=0.1%, the requirement is $z_{RMS}<0.2$ nm. This is a simple calculation of surface requirements. More sophisticated models may be used.

It is desirable that the mirror-with-diffraction grating produces as little stray light (scattered light) as possible, outside well-defined diffraction orders (including the zeroth order or specular reflection). Roughness specifications for mirrors cannot easily be translated to grating requirements. Conventionally, grating manufacturers have not had design and manufacture methods that can achieve the lowest possible stray light around the zeroth order.

Figure 4:
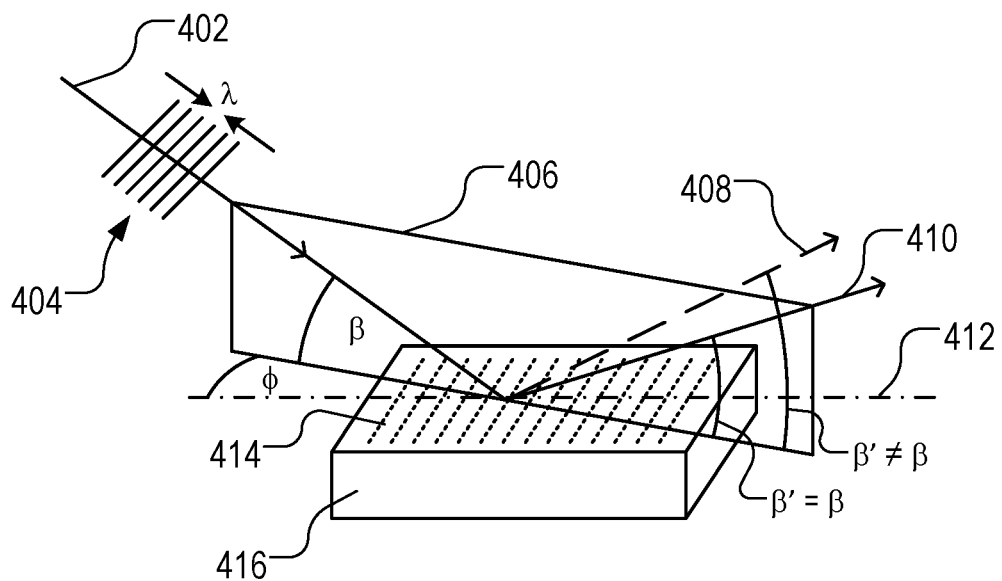
FIG. 4 depicts a schematic representation of a grating specularly reflecting and diffracting a grazing-incidence beam of radiation illustrating geometric parameters.

FIG. 4 depicts a schematic representation of a grating specularly reflecting and diffracting a grazing-incidence beam of radiation, illustrating geometric parameters. An incoming radiation beam illustrated by ray 402 has associated wavefronts 404 with a wavelength $\lambda$. The beam has a grazing angle of incidence $\beta$. The ray 402 in this example is incident on a grating 414 on mirror 416 at an angle $\phi$ with respect to the direction of periodicity 412 of the grating. When this angle $\phi$ is zero, which is the condition for planar diffraction, then the beam has a grazing angle of incidence $\beta$, with respect to the grating's direction of periodicity. Planar diffraction occurs if the incident rays and all reflected and diffracted rays are in a (flat) plane. At nonzero $\phi$ (for example, $\phi=90$ degrees), rays are on a cone; this case is called "conical diffraction". At the condition for pure conical diffraction ($\phi=90$ degrees), the bottoms of the trenches will never be obscured for any practical trench cross section. However, the embodiments described herein are used with (near) planar diffraction, preferably with $\phi<10$ degrees. Because the incident beam is diverging, $\phi$ varies across the beam. Embodiments preferably have numerical apertures below 0.05, which correspond to half-angles of 3 degrees.

The beam is specularly reflected in a zeroth-order direction 410 (at an angle that equals $\beta$) in the plane 406. The beam is diffracted in one or more diffraction-order direction, in this example a +1$^{st}$ order direction 408 (at an angle that does not equal $\beta$).

Figure 5:
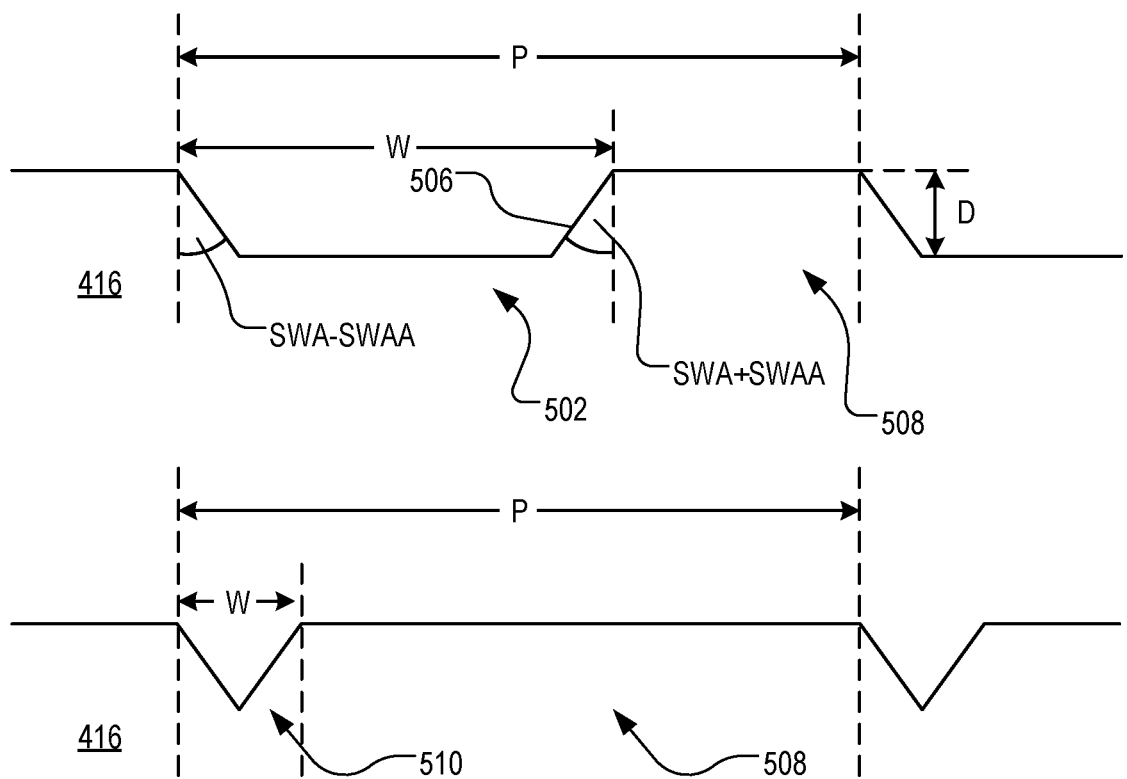
FIG. 5 depicts a schematic representation of a cross-section of a grating illustrating grating parameters.

FIG. 5 depicts a schematic representation of a cross-section of a reflective diffraction grating on a mirror 416, illustrating grating parameters. A grating period has a trench 502 (also known as a groove) with a top width W and a ridge 508, either side of a sidewall 506. The shape of a reflective diffraction grating can be characterized in terms of the main parameters: pitch P spanning the grating period, groove width W, groove depth D. Furthermore, there is the side-wall angle (SWA) and sidewall angle asymmetry (SWAA), as shown in FIG. 5. One could introduce more shape parameters, such as the slope of the trench bottom surface (floor) and the curvature of the trench bottom surface. The width of the trench may be small enough and sidewall angles may large enough that there is no flat bottom surface (floor) between the sidewalls. This trench configuration is a v-groove 510.

Figure 6:
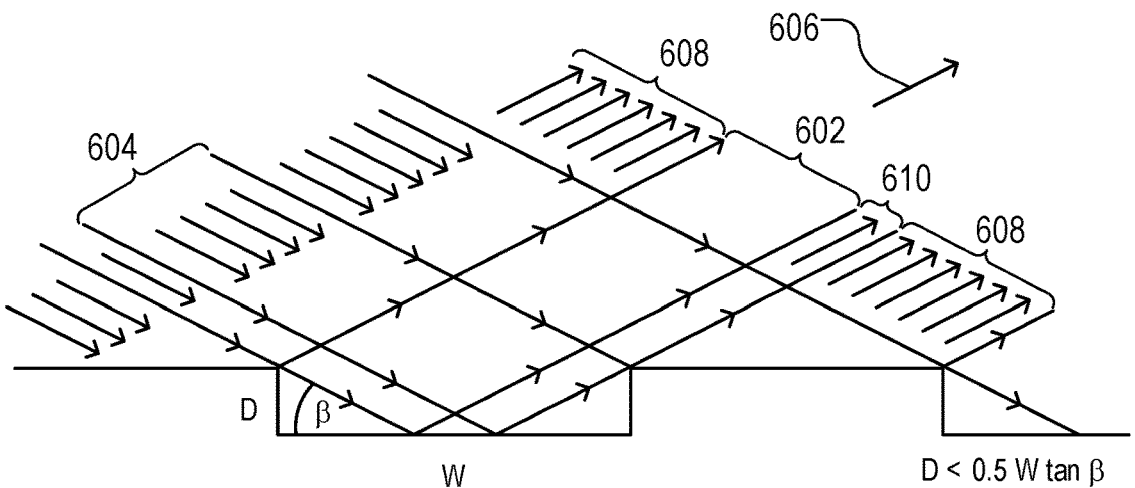
FIG. 6 depicts a schematic geometrical representation of a grating specularly reflecting a grazing-incidence beam of radiation.

FIG. 6 depicts a schematic geometrical representation of a grating specularly reflecting a grazing-incidence beam of radiation. A grating pitch may be used that is much larger than the SXR wavelength: for example, 500 nm and 14 nm respectively. We can therefore estimate the sensitivities based on quasi-geometrical optics. With reference to FIG. 6, part of the incident flux is lost 602 and does not specularly reflect due to the depth of the trench and the shadowing effect of the trench edge on the floor of the trench. A portion 604 of the incident beam is not specularly reflected in the same zeroth-order direction 606 as the beam 608 reflected from the trench tops and the beam 610 reflected specularly from the center of the trench floor. The incident flux that is reflected 610 from the trench floor acquires a phase difference relative to that which is reflected from the top of the ridges 608. This is a consequence of the path length difference arising from the depth of the trench. The waves reflected from the bottom 610 and from the top 608 add up coherently; in the coherent sum, the phase and amplitude effects are accounted for.

If the manufacturing process of the grating results in local variations of the geometrical parameters in FIG. 3, it will result in stray light, just like local height variations in a smooth mirror result in stray light. For a grazing-incidence mirror or grating in a SXR metrology apparatus, we are particularly concerned about local variations on a length scale between 1 μm and 1 mm. This is because the scattering angle is inversely proportional to the length scale of the local variations; sufficiently large scattering angles will be clipped in the light path and sufficiently small scattering angles will not lead to out-of-target illumination (i.e. stray light).

We note that the complex reflection coefficient r (phase and amplitude) of the specular reflection is dependent on the geometrical parameters. The complex reflection coefficient can be calculated using simulation software, which is available commercially or as open source.

It is also possible to make a coarse estimate based on geometrical optics if the grating period is much larger than the wavelength of the light; this results in the formula $$r = \frac{\sqrt{R_{flat}}}{P}\left[(P-W) + \left(W - \frac{2D}{\tan\beta}\right)\exp\left(-\frac{4\pi i D \sin\beta}{\lambda}\right)\right] \text{ for } W > 2D/\tan\beta \quad \text{(Eq. 1a)}$$

$$r = \frac{\sqrt{R_{flat}}}{P}(P-W) \quad \left(\text{for } W \leq \frac{2D}{\tan\beta}\right). \quad \text{(Eq. 1b)}$$

Here, $R_{flat}$ is the reflectance (power, not amplitude) for a smooth mirror surface. Eq. 1b can be understood as grooves that are so deep that any light paths via the bottom surface of the grooves (i.e. trench floors) are obscured by the vertical side walls. This does not include light paths back scattered off the sidewall on to the bottom surface.

In this parametrization, we assume that the grooves are etched into a surface that was originally polished to low roughness (e.g. <0.2 nm). A manufacturing process may also deposit ridges on top of a polished smooth surface, in which case the formulas would be:

$$r = \frac{\sqrt{R_{flat}}}{P}\left[(P-W)\exp\left(4\pi i \frac{D\sin\beta}{\lambda}\right) + \left(W - \frac{2D}{\tan\beta}\right)\right] \quad \text{(Eq. 2a)}$$
$$\left(\text{for } W > \frac{2D}{\tan\beta}\right)$$

$$r = \frac{\sqrt{R_{flat}}}{P}\left[(P-W)\exp\left(4\pi i \frac{D\sin\beta}{\lambda}\right)\right] \quad \left(\text{for } W \leq \frac{2D}{\tan\beta}\right). \quad \text{(Eq. 2b)}$$

Suppose that a particular grating design has parameters $P_0$, $W_0$, $D_0$, resulting in a complex reflection coefficient $r_0$ (assuming a particular grazing angle $\beta$ and wavelength $\lambda$. Local variations $\Delta W$, $\Delta D$ (expressed as RMS values) will result in a total integrated scatter $$TIS \approx \frac{\left|\frac{\partial r}{\partial W}\Delta W\right|^2 + \left|\frac{\partial r}{\partial D}\Delta D\right|^2}{r_0^2}. \quad \text{(Eq. 3)}$$

P, W, and D may be determined such that the partial derivatives $\partial r/\partial W$ and $\partial r/\partial D$ are as small as possible, such that the sensivity to variation in W and D is as small as possible.

In this example, only W and D are considered as parameters with spatial variation. It can be generalized for more parameters by adding the corresponding quadratic terms to the numerator in Eq. (3).

The optimal combination of parameters depends on how well W and D can be controlled in the patterning process. For example, if W can be controlled with high accuracy, but D cannot, then W and D may be determined such that $W<2D/\tan\beta$; then (according to Eq. 1b), there is no sensitivity to the D parameter.

The equations (1) and (2) are approximations. However, rigorous simulations show that narrow, deep grooves allow a much larger (2×-4×) tolerance on groove depth than wide, shallow grooves. In metrology apparatus applications with SXR wavelengths of interest $10 \leq \lambda \leq 20$ nm (rather than any leaked infrared light), grazing angles of incidence in the range 1 deg$<\beta<$17 deg are useful. Useful pitches are in the range $$\frac{\min(\lambda)}{\alpha_1 \sin\beta} < P < \frac{\max(\lambda)}{\alpha_2 \sin\beta},$$

where $\alpha_1=0.5$ and $\alpha_2=0.05$. (These constants are the highest and lowest first-order diffraction angles that are useful, in radians). A lithographic patterning process may be considered easiest for a ratio $0.25<W/P<0.75$ for optical lithography. Low sensitivity to groove depth is achieved roughly for $$D > 0.6 \, W \tan \beta. \quad \text{(Eq. 4)}$$

The factor 0.6 is "a bit more than ½" which is the analytical threshold. Although the pitch is much greater than wavelength, this is not true for the depth (7-15 nm in the examples below). Therefore, the wave-like nature of the radiation still affects the reflection/diffraction properties of the grating. It has been found that there is strong drop in sensitivity to groove depth D in the range 0.4 to 0.8. The threshold may thus be set at for example 0.4, 0.6, or 0.8.

These inequalities define a region in 4D parameter space (P, W, D, $\beta$) that would be of interest with the purpose of minimizing sensitivity with respect to the groove depth. The parameter space may include further dimensions, for example if trench-floor tilt or other parameters are included.

If the groove depth is taken according to the above expressions, it tends to result in a large sensitivity with respect to groove width W, all else being equal. Also, deep grooves tend to lead to larger absorption losses. Lowering the sensitivity to both groove depth and groove width can be achieved by choosing the groove width as small as possible and the depth according to Eq. (4).

A goal for an implementation in a metrology apparatus is a grating with a high reflectance in zeroth order (R0), low diffraction efficiency in first order (R1) and low sensitivities to width and depth variations. Using the above considerations, a number of possible implementations may be considered. A first example is a grating with nominal pitch of 500 nm and duty cycle (W/P) of 50%. The angle of incidence is the smallest angle allowed by optical design considerations. The depth is chosen to fulfil Eq. 4 by a margin.

| Parameter | Value | Units |
| --- | --- | --- |
| $\beta$ | 4 | deg |
| P | 500 | nm |
| W | 250 | nm |
| D | 15 | nm |

In case a different set of optical design boundary conditions is taken, a smaller angle of incidence on the grating can be allowed for. This changes the table to:

| Parameter | Value | Units |
| --- | --- | --- |
| $\beta$ | 2.75 | deg |
| P | 500 | nm |
| W | 250 | nm |
| D | 10 | nm |

Both examples above consider a duty cycle of 50%. Ideally, a much smaller duty cycle is used, as this decreases scattering, increases R0 and decreases R1. Such a grating could be described by:

| Parameter | Value | Units |
| --- | --- | --- |
| $\beta$ | 4 | deg |
| P | 500 | nm |
| W | 125 | nm |
| D | 7 | nm |

The grating may be a Variable Line Space (VLS) grating, which has no constant pitch but a pitch that varies gradually across the grating surface. One purpose of the VLS is to minimize aberrations of the diffracted light on the detector. To be on the safe side, the largest pitch should be considered, as this pitch has also the largest width and is this limiting the performance according to Eq. 4. This is described below with reference to FIG. 12. Alternatively, if processing allows the groove depth could be varied over the grating (larger local pitch is larger depth) to optimize scattering versus R0 locally. This is described below with reference to FIG. 13.

The above description concerns improving the scattering performance on the specular reflection (zeroth-order diffraction). If one wishes to eliminate the contribution of stray light to a measured spectrum, one could use a similar approach: simulations or geometric arguments. The geometric rule in Eq. (4) can be generalized for the case that the grazing angle of incidence β, with respect to the grating's direction of periodicity, is not equal to the grazing angle of "reflection" β', as is the case with for example the first-order diffraction. The geometric rule becomes $$D > \frac{1.2W}{\frac{1}{\tan\beta} + \frac{1}{\tan\beta'}} \quad \text{(Eq. 5)}$$

where the factor 1.2 means "a bit more than one" to account for the fact that a geometric approximation is not fully correct.

Figure 7:
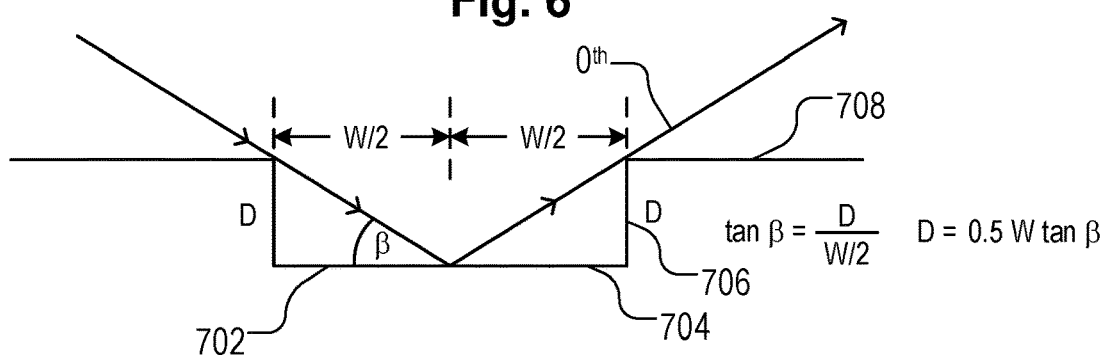
FIG. 7 depicts a schematic geometrical representation of a grating trench at the depth threshold for specular reflection from the trench floor being obscured by the sidewall.

FIG. 7 depicts a schematic geometrical representation of a grating trench at the depth threshold, D=0.5 W tan β, for specular reflection from the trench floor being obscured by the sidewall. The left-hand half 702 of the trench floor is in shadow for an incoming beam with a grazing angle of incidence β. Specular reflection of the beam from the remaining right-hand half 704 of the trench floor in the zeroth-order direction is obscured by the sidewall 706 facing the incident beam. There is specular reflection from the top of the ridges 708 (as illustrated in FIG. 6) in the zeroth-order direction. Thus, when D=0.5 W tan β the portion of the incident beam that is specularly reflected away from the trench in the same zeroth order direction tends to zero, assuming no diffraction around the top of the sidewall 706.

Figure 8:
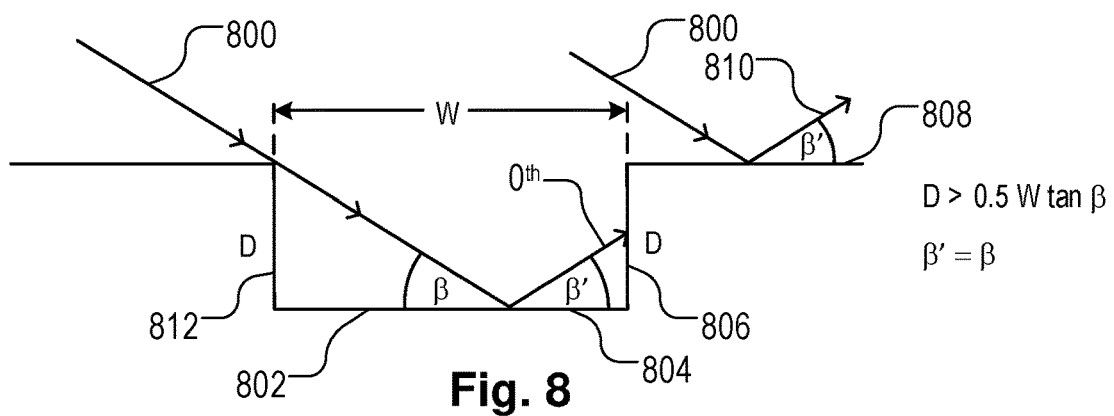
FIG. 8 depicts a schematic geometrical representation of a deep grating trench such that specular reflection from the trench floor is obscured by the sidewall, in accordance with an embodiment of the present invention.

FIG. 8 depicts a schematic geometrical representation of a deep grating trench such that specular reflection from the trench floor is obscured by the sidewall.

With reference to FIG. 8, a trench and ridge are part of a reflective diffraction grating for specularly reflecting and diffracting a grazing-incidence beam of radiation incident on the grating. The grating has a periodic structure (as shown in FIGS. 5 and 6) with a grating period comprising first (ridge) and second (trench) substructures either side of a sidewall 806 facing the incident beam 800. The incident beam has grazing angle of incidence β at the trench with respect to the local direction of periodicity of the grating periods including the trench. The grazing angle of incidence β is in the range 1 degree the 17 degrees, preferably in the range 3 degrees to 5 degrees. The ridge is configured to specularly reflect the beam from the flat top 808 of the ridge into a specularly reflected beam 810 in a zeroth-order direction β'=β. The beam is incident at a grazing angle of incidence β on grating periods including a trench. These grating periods including the trench, thus those which are local to the trench under consideration, are configured with fixed or varying pitch to diffract the beam from the grating periods in one or more non-zero-diffraction-order direction β'≠β (not shown in FIG. 8). There are grating periods that do not include the trench under consideration, for example those not local to the trench under consideration. When the grating is curved and/or when the pitch of the grating varies, those grating periods may diffract the beam in a different non-zero-diffraction-order direction with respect to the trench under consideration.

As described above, the shape of the trench may be described by structural parameters top width W and depth D that define the aspect ratio of the trench. The aspect ratio of a substructure such as a trench is the ratio of its sizes in different dimensions, herein defined as W/D. The shape is determined such that any rays of the beam that reflect once from the trench floor in the zeroth-order direction are obscured by the sidewall. In the example of FIG. 8, the trench, and therefore the sidewall separating it from the trench top, is determined to have a depth D greater than that shown at the same scale in FIG. 7. The trench floor 802, 804 and sidewall 806 are thus configured such that any rays of the beam that reflect once from the trench floor in the zeroth-order direction are obscured by the sidewall. The flat top of the ridge and flat floor of the trench are parallel. If the mirror surface is curved, then there may be a corresponding but small curvature of the flat top of the ridge and the flat floor of the trench, conforming to curvature of the mirror surface. The greater depth causes over half of the left-hand side 802 of the trench floor to be in shadow for the incoming beam 800. Specular reflection of the beam from the remaining right-hand region 804 of the trench floor in the zeroth-order direction is all obscured by the sidewall 806. It is obscured from the zeroth-order direction because it is either absorbed or specularly reflected back towards the incident beam. Multiple reflections from the top of the sidewall 806, back onto the trench floor 802 and off the other sidewall 812 could redirect a negligible portion of the beam in the zeroth-order direction. Similarly, for a particular configuration of grazing-angle of incidence and sidewall angles, a double reflection from the top of the sidewall 806, and off the other sidewall 812 could redirect a negligible portion of the beam in the zeroth-order direction. It is negligible because of the losses on reflection of this short-wavelength radiation, and at grazing angles of incidence with respect to the sidewall surfaces of over 20 degrees. Thus, the portion of the incident beam that is specularly reflected away from the trench in the same zeroth-order direction as for specular reflection from the ridge tops tends to zero.

The grating may be fabricated on a mirror surface which is curved, such as an ellipsoidal mirror as described with reference to FIG. 3. Other suitable curved shapes include toroidal, elliptical cylinder, paraboloid, parabolic cylinder, hyperboloid and hyperbolic cylinder. The flat ridge top and trench floor may be slightly curved to conform to curvature of the mirror. A mirror is a substrate that has been polished to obtain a low scattering reflective surface. The surface is polished such that scattering is sufficiently suppressed and a grating is added that (when made according embodiments) will not add more scattering that desired. Holographic methods may be used to pattern the grating, with suitable pattern transfer techniques such as etching.

The structural parameters defining the aspect ratio of the trench are determined to satisfy the inequality $$D > \frac{W}{\frac{1}{\tan\beta} + \frac{1}{\tan\beta'}} \quad \text{(Eq. 6)}$$

where D is depth of the trench, W is top width of the trench, β is the grazing angle of incidence, with respect to the grating's direction of periodicity, and β' is the zeroth-order direction (β'=β) or a non-zero-diffraction-order direction (β'≠β), with respect to the grating's direction of periodicity.

This resolves to Eq. 4 when $\beta'=\beta$ and 0.5 W of the analytical threshold is changed to 0.6 W to allow for.

Embodiments have a low diffraction efficiency in the first diffraction order and high specular reflectance, with greatly reduced scattering around specular reflection. Thus, the grating periods are configured to specularly reflect preferably a majority of the specularly reflected and diffracted radiation, more preferably over 70% or most preferably over 90%. In an ideal case with a 1 or 2 degree grazing incidence angle and an optimum mirror material, grating periods are configured to specularly reflect over 97% of the specularly reflected and diffracted radiation (i.e. total reflected and diffracted power). The grating periods are configured with a grating pitch over trench width ratio of preferably over 0.5, more preferably over 0.7 or most preferably over 0.9. The radiation has a wavelength in the range 1 nm to 100 nm, preferably in the range 10 nm to 20 nm.

In other examples, no rays of the beam reflect once from the second substructure into the zeroth-order direction, because there is no flat floor in a line of sight with the incident beam. Such examples include v-groove trenches, trenches with a large enough sidewall slope, or trenches with sloping floors (compared to the ridge surface). In such examples, it holds that any rays of the beam that reflect once from the second substructure into the zeroth-order direction are obscured by the sidewall.

Figure 9:
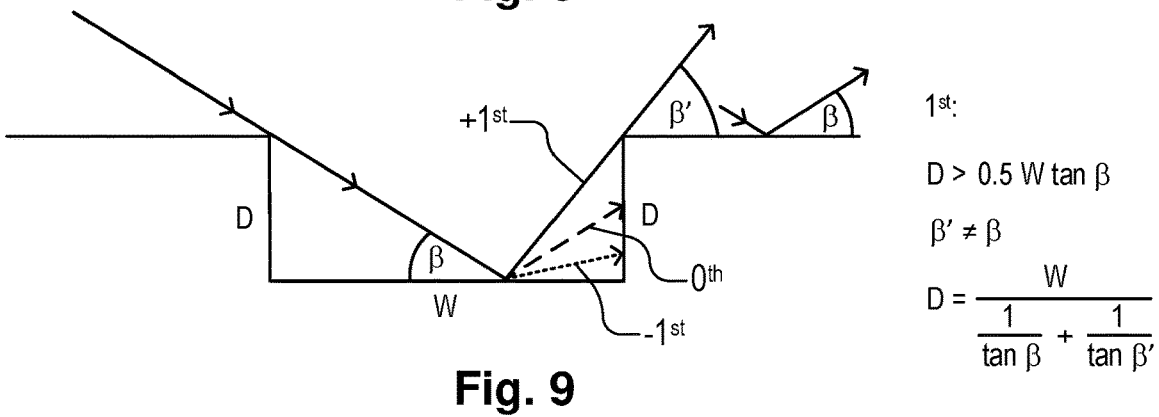
FIG. 9 depicts a schematic geometrical representation of a grating trench at the depth threshold for first-order diffraction from the trench floor being obscured by the sidewall, in accordance with an embodiment of the present invention.

FIG. 9 depicts a schematic geometrical representation of a grating trench at the depth threshold for first-order diffraction from the trench floor being obscured by the sidewall.

The configuration of the trench and the sidewall is determined, using a wavelength of the incident beam and a pitch (P) of the grating periods including the trench, a configuration such that any diffraction of the beam from the trench in a selected non-zero-diffraction-order direction (in this example first-order) is obscured by the sidewall. The structural parameters defining the aspect ratio of the trench are determined to satisfy the inequality of Eq. 6. (with $\beta'\neq\beta$).

Figure 10:
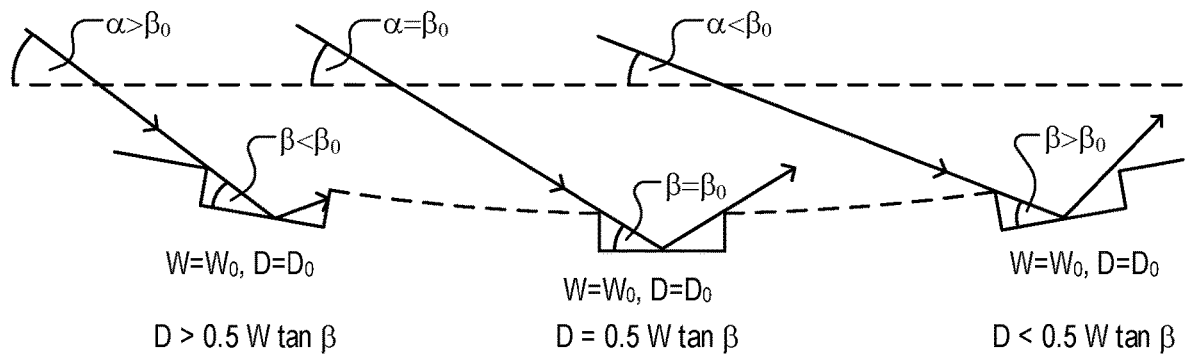
FIG. 10 depicts a schematic geometrical representation of a curved grating with divergent incoming rays.

FIG. 10 depicts a schematic geometrical representation of a curved grating with divergent incoming rays. Embodiments are implemented in a metrology apparatus with a large numerical aperture NA compared to synchrotron, for example 0.005<NA<0.1. A diverging beam and a curved mirror allow a short path-length and small volume compared to synchrotron. The divergence of the incident beam results in different grazing angles of incidence on the grating $\alpha$ across the grating. If we define the grazing angle of incidence to the middle trench of FIG. 10 as $\beta_0$, then the grazing angle of incidence on the grating $\alpha$ varies from values greater than $\beta_0$ to values less than $\beta_0$ across the grating. FIG. 10 shows inequalities between the various angles, but the sign (< or >) depends on what part of the ellipse is being shown. The inequalities for $\beta$ and $\beta_0$ in FIG. 10 apply to the case where the object focal point is further away from the mirror than the image focal point.

The curvature of the grating and the divergence of the incident beam results in different grazing angles of incidence of the beam incident at the trenches (locally with respect to the reference frame of the respective trench) $\beta$ across the grating. The effects of beam divergence and curvature add together to make the resulting local value of $\beta$. In this example, the grazing angle of incidence $\beta$ of the beam incident at the trenches varies from values less than $\beta_0$ to values greater than $\beta_0$.

Figure 11:
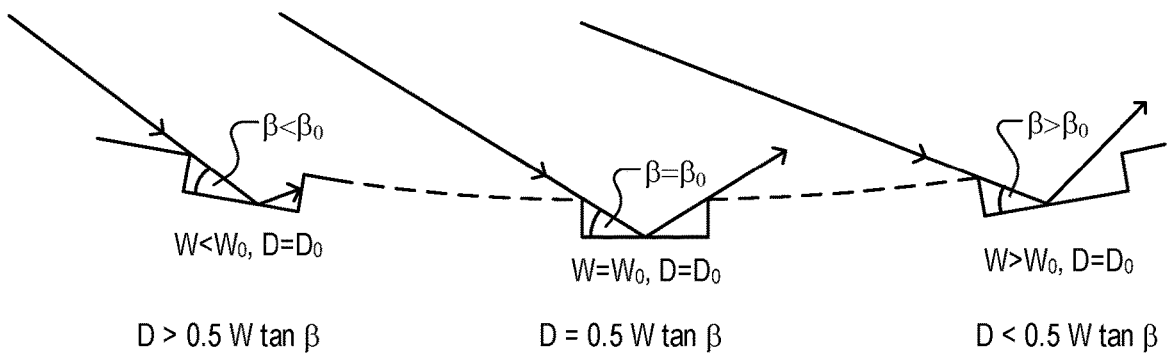
FIG. 11 depicts a schematic geometrical representation of a curved variable line/space grating.

FIG. 11 depicts a schematic geometrical representation of a curved variable line/space grating. The trench depth is a uniform value $D_0$. The grating may have a varying top width of the trench top W (from W<$W_0$ to W>$W_0$) for example because it has a varying pitch and a constant duty cycle which is convenient to manufacture. The right-hand trench has D<0.5 W tan $\beta$ therefore some specular reflection of the beam from the trench floor in the zeroth-order direction is not obscured by the sidewall. This may result in unwanted stray light arriving outside the target.

Figure 12:
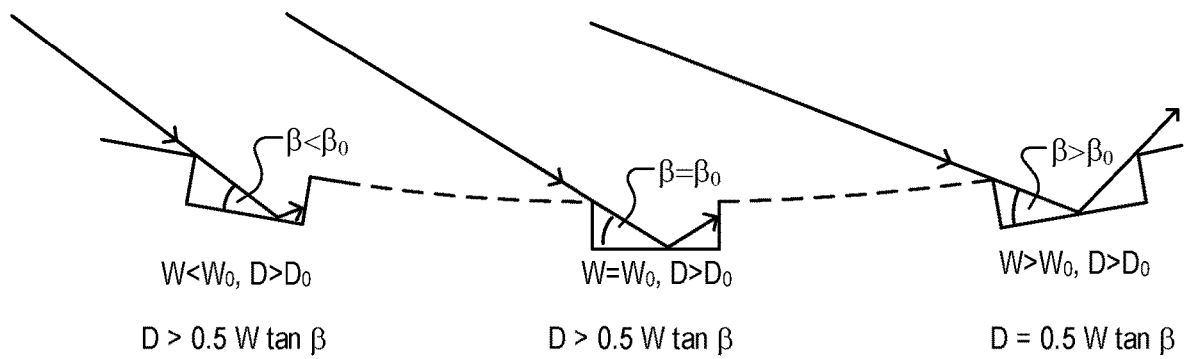
FIG. 12 depicts a schematic geometrical representation of a curved variable line/space grating with a trench depth at the threshold for specular reflection from the floor of the trench with the widest top being obscured by the sidewall.

FIG. 12 depicts a schematic geometrical representation of a curved variable line/space grating with a trench depth at the threshold for specular reflection from the floor of the trench with the widest top being obscured by the sidewall. When the grating has a varying top width of the trench top W, the depth (D>$D_0$) of the trench may be selected to satisfy the inequality of Eq. 6 for a largest top width of the varying top width. Note that also on a flat grating the divergence of the incident beam leads to a variation of the angle of incidence, and a similar optimization may be done in such a case.

Figure 13:
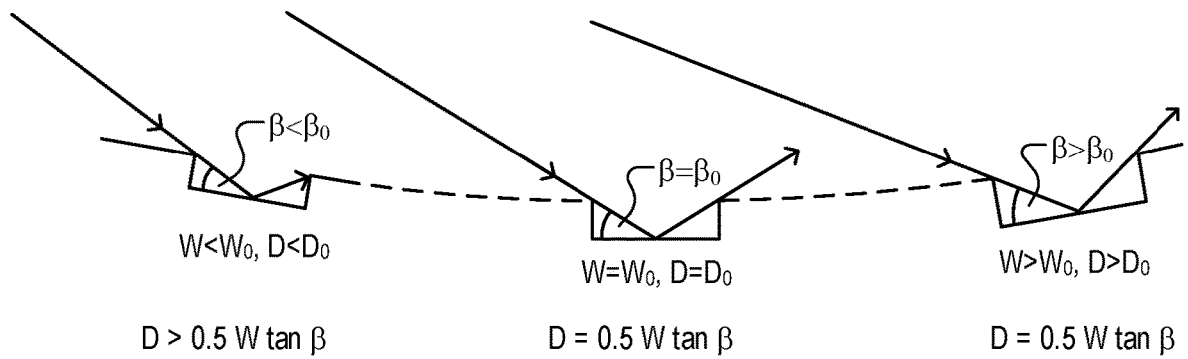
FIG. 13 depicts a schematic geometrical representation of a curved variable line/space grating with a varying trench depth at the threshold for specular reflection from the any trench floor being obscured by the sidewall.

FIG. 13 depicts a schematic geometrical representation of a curved variable line/space grating with a varying trench depth at the threshold for specular reflection from the any trench floor being obscured by the sidewall. As for FIG. 12, the grating has a varying top width of the trench W. In this case, rather than selecting a deep trench depth for all trenches, the depth (D) of the trench may be varied (from D<$D_0$ to D>$D_0$) to satisfy the inequality of Eq. 6 in correspondence with the varying width.

The gratings described with reference to FIGS. 4 to 13 may be used in an inspection apparatus, such as a metrology apparatus described with reference to FIGS. 2 and 3. The gratings described with reference to FIGS. 4 to 13 may also be used in a lithographic apparatus, such as described with reference to FIG. 1. These apparatuses then comprise:
 a radiation source 310, 311 operable to provide a beam of radiation;
 a reflective diffraction grating 312 as described with reference to FIGS. 4 to 13, arranged to receive the beam of radiation;
 a target support 316 for supporting a target T arranged to receive the specularly reflected beam; and
 a detector 314 arranged to receive a diffracted beam diffracted from the grating periods.

Figure 14:
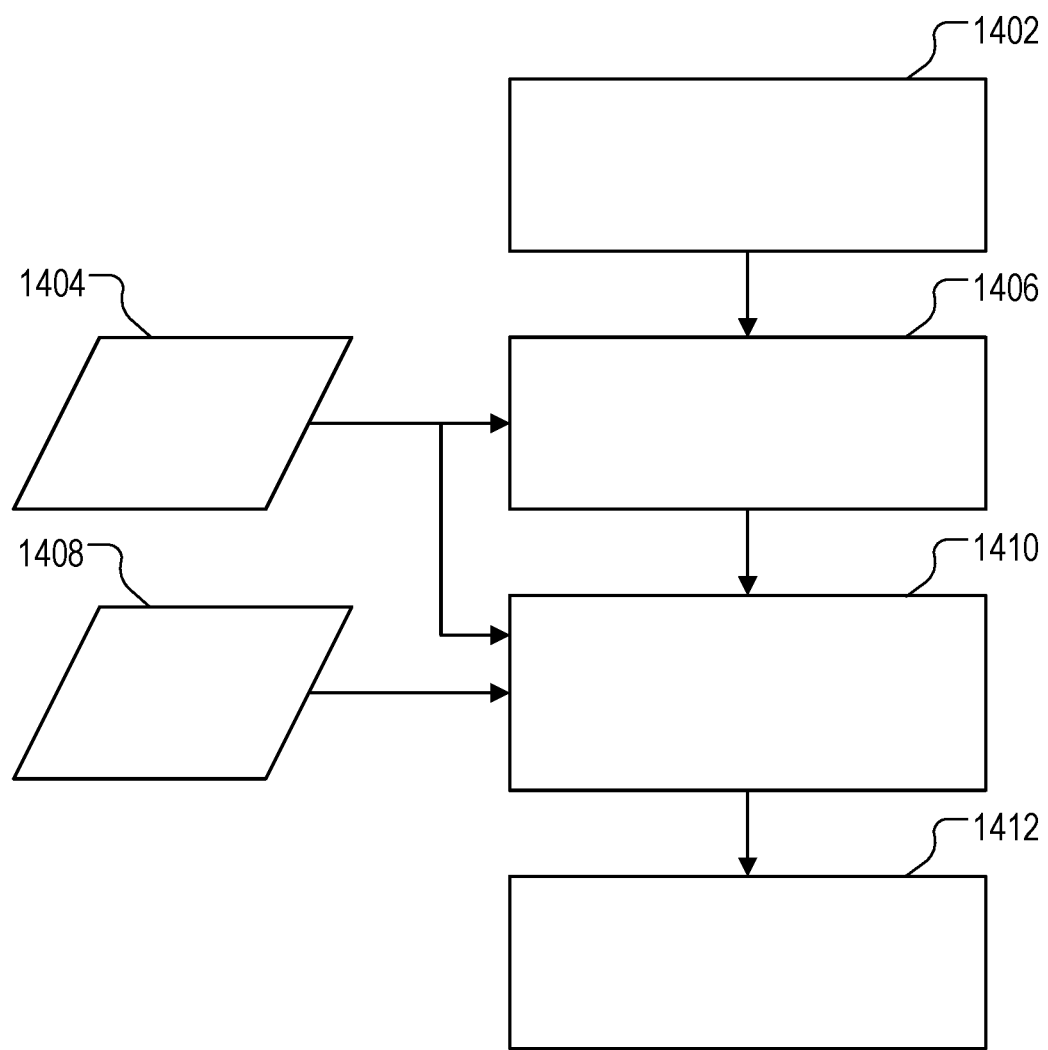
FIG. 14 is a flowchart of a method of manufacturing a reflective diffraction grating in accordance with an embodiment of the present invention.

FIG. 14 is a flowchart of a method of manufacturing a reflective diffraction grating in accordance with an embodiment of the present invention. The method produces a reflective diffraction grating for specularly reflecting and diffracting a grazing-incidence beam of radiation incident on the grating. The radiation may have a wavelength in the range 1 nm to 100 nm, preferably in the range 10 nm to 20 nm. The grating may be as described with reference to FIGS. 8 to 13, having a periodic structure with a grating period comprising first (ridge) and second (trench) substructures either side of a sidewall facing the incident beam. The method comprises the following steps:
 1402: determining a configuration of the ridge to specularly reflect the beam from the ridge into a specularly reflected beam in a zeroth-order direction $\beta'=\beta$. The beam is incident at a grazing angle of incidence $\beta$, with respect to the grating's direction of periodicity, on grating periods including a trench. The grating periods are configured to specularly reflect preferably a majority of the specularly reflected and diffracted radiation, more preferably over 70% or most preferably over 90%. In an ideal case with a 1 or 2 degree grazing incidence angle and an optimum mirror material, grating periods are configured to specularly reflect over 97% of the specularly reflected and diffracted radiation (i.e. total reflected and diffracted power). The grating periods are configured with a grating pitch over trench width ratio of preferably over 0.5, more preferably over 0.7 or most preferably over 0.9.

1406: determining a fixed or varying pitch configuration of grating periods including the trench to diffract the beam from the grating periods in one or more diffraction-order direction $\beta' \neq \beta$. This uses information 1404 including the wavelength of the incident beam and the pitch of the grating periods including the trench under consideration. The ridge comprises a flat top and the trench comprises a flat floor parallel to the flat top of the ridge.

1410: determining, based on a value of the grazing angle of incidence $\beta$ 1408 of the beam incident at a trench, a configuration of the trench and a sidewall of its grating period such that any rays of the beam that reflect once from the trench in the zeroth-order direction are obscured by the sidewall. The grazing angle of incidence $\beta$ may be in the range 1 degree to 17 degrees, preferably in the range 3 degrees to 5 degrees. This step of determining the configuration of the trench and the sidewall may comprise determining, using a wavelength of the incident beam and a pitch (P) of the grating periods including the trench, a configuration such that any diffraction of the beam from the trench in a selected non-zero-diffraction-order direction ($\beta' \neq \beta$) is obscured by the sidewall. Step 1408 comprises determining a shape of the trench. This involves determining one or more structural parameters (W, D) defining an aspect ratio of the trench. This comprises satisfying the inequality $$D > \frac{W}{\frac{1}{\tan\beta} + \frac{1}{\tan\beta'}}$$

where D is depth of the trench, W is top width of the trench, $\beta$ is the grazing angle of incidence, with respect to the grating's direction of periodicity, and $\beta'$ is the zeroth-order direction ($\beta' = \beta$) or a non-zero-diffraction-order direction ($\beta' \neq \beta$), with respect to the grating's direction of periodicity. When the grating has a varying top width of the trench (W), the depth (D) of the trench is selected to satisfy the inequality for a largest top width of the varying top width, as described with reference to FIG. 12. Alternatively, the depth (D) of the trench is varied to satisfy the inequality in correspondence with the varying width, as described with reference to FIG. 13. Another step may be included to optimize floor tilt and/or SWA and/or other parameters.

1412: manufacturing the grating using the determined configurations of the ridge, sidewall and trench. The grating may be manufactured on a mirror surface.

Further embodiments are provided in the subsequent numbered clauses:

1. A method of manufacturing a reflective diffraction grating for specularly reflecting and diffracting a grazing-incidence beam of radiation incident on the grating, the grating having a periodic structure with a grating period comprising first and second substructures either side of a sidewall facing the incident beam, the method comprising the steps:
    determining a configuration of the first substructure to specularly reflect the beam, incident at a grazing angle of incidence, with respect to the grating's direction of periodicity, on grating periods including a second substructure, from the first substructure into a specularly reflected beam in a zeroth-order direction;
    determining a fixed or varying pitch configuration of grating periods including the second substructure to diffract the beam from the grating periods in one or more non-zero-diffraction-order direction;
    determining, based on the grazing angle of incidence, a configuration of the second substructure and a sidewall of its grating period such that any rays of the beam that reflect once from the second substructure into the zeroth-order direction are obscured by the sidewall; and
    manufacturing the grating using the determined configurations of the first and second substructures and sidewall.

2. The method of clause 1 wherein the step of determining the configuration of the second substructure and the sidewall comprises determining, using a wavelength of the incident beam and a pitch of the grating periods including the second substructure, a configuration such that any rays of the beam that diffract from the second substructure into a selected non-zero-diffraction-order direction are obscured by the sidewall.

3. The method of any preceding clause wherein the step of manufacturing the grating comprises fabricating the grating on a mirror surface.

4. The method of clause 3 wherein the mirror surface is curved.

5. The method of any preceding clause wherein the first substructure comprises a ridge and the second substructure comprises a trench.

6. The method of clause 5 wherein the ridge comprises a flat top and the trench comprises a flat floor parallel to the flat top of the ridge.

7. The method of any clause 5 or clause 6 wherein the step of determining a configuration of the second substructure and the sidewall comprises determining a shape of the trench.

8. The method of any of clauses 5 to 7 wherein the step of determining a configuration of the second substructure and the sidewall comprises determining one or more structural parameters defining an aspect ratio of the trench.

9. The method of clause 8 wherein determining one or more structural parameters defining an aspect ratio of the trench comprises satisfying the inequality $$D > \frac{W}{\frac{1}{\tan\beta} + \frac{1}{\tan\beta'}}$$

where D is depth of the trench, W is top width of the trench, $\beta$ is the grazing angle of incidence and $\beta'$ is the zeroth-order direction or a non-zero-diffraction-order direction.

10. The method of clause 9 wherein the grating has a varying top width of the trench and wherein the depth of the trench is selected to satisfy the inequality for a largest top width of the varying top width.

11. The method of clause 9 wherein the grating has a varying top width of the trench and wherein the depth of the trench is varied to satisfy the inequality in correspondence with the varying width.

12. The method of any of clauses 5 to 11 wherein the grating periods are configured with a grating pitch over trench width ratio of over 0.5

13. The method of clause 12 wherein the grating periods are configured with a grating pitch over trench width ratio of over 0.7.

14. The method of clause 13 wherein the grating periods are configured with a grating pitch over trench width ratio of over 0.9.

15. The method of any of clauses 1 to 11 wherein the grating periods are configured to specularly reflect a majority of the specularly reflected and diffracted radiation.

16. The method of clause 15 wherein the grating periods are configured to specularly reflect over 70% of the specularly reflected and diffracted radiation.

17. The method of clause 16 wherein the grating periods are configured to specularly reflect over 90% of the specularly reflected and diffracted radiation.

18. The method of any preceding clause wherein the radiation has a wavelength in the range 1 nm to 100 nm.

19. The method of clause 18 wherein the radiation has a wavelength in the range 10 nm to 20 nm.

20. The method of any preceding clause wherein the grazing angle of incidence is in the range 1 degree to 17 degrees.

21. The method of clause 20 wherein the grazing angle of incidence is in the range 3 degrees to 5 degrees.

22. The method of any of clauses 1 to 21 when referring to clause 3 wherein the mirror surface has a root mean square surface error less than 0.2 nm.

23. The method of any of clauses 1 to 22 wherein the fixed or varying pitches are in the range:

$$\frac{\min(\lambda)}{\alpha_1 \sin\beta} < P < \frac{\max(\lambda)}{\alpha_2 \sin\beta'},$$

where $\alpha_1 = 0.5$ and $\alpha_2 = 0.05$, $\lambda$ is wavelength, $\beta$ is the grazing angle of incidence and $\beta'$ is the zeroth-order direction or a non-zero-diffraction-order direction.

24. The method of clause 8 wherein determining one or more structural parameters defining an aspect ratio of the trench comprises satisfying the inequality $$D > 0.6\, W \tan\beta$$

where D is depth of the trench, $\beta$ is the grazing angle of incidence and W is top width of the trench.

25. The method of any of clauses 1 to 24 wherein the reflective diffraction grating is a Variable Line Space grating.

26. The method of any of clause 25 wherein largest pitch of the Variable Line Space grating is in the range:

$$\frac{\min(\lambda)}{\alpha_1 \sin\beta} < P < \frac{\max(\lambda)}{\alpha_2 \sin\beta'},$$

where $\alpha_1 = 0.5$ and $\alpha_2 = 0.05$, $\lambda$ is wavelength, $\beta$ is the grazing angle of incidence and $\beta'$ is the zeroth-order direction or a non-zero-diffraction-order direction.

27. A reflective diffraction grating for specularly reflecting and diffracting a grazing-incidence beam of radiation incident on the grating, the grating having a periodic structure with a grating period comprising first and second substructures either side of a sidewall facing the incident beam, the grating comprising:
  a first substructure configured to specularly reflect the beam, incident at a grazing angle of incidence, with respect to the grating's direction of periodicity, on grating periods including a second substructure, from the first substructure into a specularly reflected beam in a zeroth-order direction and
  grating periods including the second substructure configured with fixed or varying pitch to diffract the beam from the grating periods in one or more non-zero-diffraction-order direction,
  wherein the second substructure and a sidewall are configured such that any rays of the beam that reflect once from the second substructure in the zeroth-order direction are obscured by the sidewall and
  wherein the grating periods are configured to specularly reflect a majority of the specularly reflected and diffracted radiation.

28. The reflective diffraction grating of clause 27 wherein the grating periods are configured to specularly reflect over 70% of the specularly reflected and diffracted radiation.

29. The reflective diffraction grating of clause 28 wherein the grating periods are configured to specularly reflect over 90% of the specularly reflected and diffracted radiation.

30. The reflective diffraction grating of any of clauses 27 to 29 wherein the second substructure and the sidewall are configured such that any rays of the beam that diffract from the second substructure into a selected non-zero-diffraction-order direction are obscured by the sidewall.

31. The reflective diffraction grating of any of clauses 27 to 29 wherein the grating is fabricated on a mirror surface.

32. The reflective diffraction grating of clause 31 wherein the mirror surface is curved.

33. The reflective diffraction grating of any of clauses 27 to 32 wherein the first substructure comprises a ridge and the second substructure comprises a trench.

34. The reflective diffraction grating of clause 33 wherein the ridge comprises a flat top and the trench comprises a flat floor parallel to the flat top of the ridge.

35. The reflective diffraction grating of clause 33 or clause 34 wherein the shape of the trench is configured such that any rays of the beam that reflect once from the second substructure in the zeroth-order direction are obscured by the sidewall.

36. The reflective diffraction grating of any of clauses 33 to 35 wherein or more structural parameters defining an aspect ratio of the trench satisfy the inequality $$D > \frac{W}{\frac{1}{\tan\beta} + \frac{1}{\tan\beta'}}$$

where D is depth of the trench, W is top width of the trench, $\beta$ is the grazing angle of incidence and $\beta'$ is the zeroth-order direction or a non-zero-diffraction-order direction.

37. The reflective diffraction grating of clause 36 wherein the grating has a varying top width of the trench and wherein the depth of the trench is configured to satisfy the inequality for a largest top width of the varying top width.

38. The reflective diffraction grating of clause 36 wherein the grating has a varying top width of the trench and wherein the depth of the trench is varied to satisfy the inequality in correspondence with the varying width.

39. The reflective diffraction grating of any of clauses 33 to 38 wherein the grating periods are configured with a grating pitch over trench width ratio of over 0.5

40. The reflective diffraction grating of clause 39 wherein the grating periods are configured with a grating pitch over trench width ratio of over 0.7.

41. The reflective diffraction grating of clause 40 wherein the grating periods are configured with a grating pitch over trench width ratio of over 0.9.

42. The reflective diffraction grating of any of clauses 27 to 41 wherein the radiation has a wavelength in the range 1 nm to 100 nm.

43. The reflective diffraction grating clause 42 wherein the radiation has a wavelength in the range 10 nm to 20 nm.
44. The reflective diffraction grating of any of clauses 27 to 43 wherein the grazing angle of incidence is in the range 1 degree to 17 degrees.
45. The method of any of clauses 27 to 44 when referring to clause 31 wherein the mirror surface has a root mean square surface error less than 0.2 nm.
46. The method of any of clauses 27 to 45 wherein the fixed or varying Ditches are in the range:

$$\frac{\min(\lambda)}{\alpha_1 \sin\beta} < P < \frac{\max(\lambda)}{\alpha_2 \sin\beta},$$

where $\alpha_1=0.5$ and $\alpha_2=0.05$, $\lambda$ is wavelength, $\beta$ is the grazing angle of incidence and $\beta'$ is the zeroth-order direction or a non-zero-diffraction-order direction.
47. The reflective diffraction grating of any of clauses 33 to 35 wherein or more structural parameters defining an aspect ratio of the trench satisfy the inequality $$D > 0.6 \, W \tan \beta$$

where D is depth of the trench, $\beta$ is the grazing angle of incidence and W is top width of the trench.
48. The reflective diffraction grating of any of clauses 27 to 47 wherein the reflective diffraction grating is a Variable Line Space grating.
49. The reflective diffraction grating of clause 48 wherein largest pitch of the Variable Line Space grating is in the range:

$$\frac{\min(\lambda)}{\alpha_1 \sin\beta} < P < \frac{\max(\lambda)}{\alpha_2 \sin\beta},$$

where $\alpha_1=0.5$ and $\alpha_2=0.05$, $\lambda$ is wavelength, $\beta$ is the grazing angle of incidence and $\beta'$ is the zeroth-order direction or a non-zero-diffraction-order direction.
50. The reflective diffraction grating of clause 44 wherein the grazing angle of incidence is in the range 3 degrees to 5 degrees.
51. An inspection apparatus comprising:
  a radiation source operable to provide a beam of radiation for illumination of a target;
  a reflective diffraction grating of any of clauses 22 to 40, arranged to receive the beam of radiation;
  a target support for supporting the target arranged to receive the specularly reflected beam; and
  a detector arranged to receive a diffracted beam diffracted from the grating periods.
52. A metrology apparatus comprising the inspection apparatus of clause 46.
53. A lithographic apparatus comprising the inspection apparatus of clause 46.

Although specific reference may be made in this text to the use of inspection, metrology and lithographic apparatus in the manufacture of ICs, it should be understood that the apparatus described herein may have other applications. Possible other applications include the manufacture of integrated optical systems, guidance and detection patterns for magnetic domain memories, flat-panel displays, liquid-crystal displays (LCDs), thin-film magnetic heads, etc.

Although specific reference may be made in this text to embodiments of the invention in the context of a lithographic apparatus, embodiments of the invention may be used in other apparatus. Embodiments of the invention may form part of a mask inspection apparatus, a metrology apparatus, or any apparatus that measures or processes an object such as a wafer (or other substrate) or mask (or other patterning device). These apparatuses may be generally referred to as lithographic tools. Such a lithographic tool may use vacuum conditions or ambient (non-vacuum) conditions.

Although specific reference may have been made above to the use of embodiments of the invention in the context of optical lithography, it will be appreciated that the invention, where the context allows, is not limited to optical lithography and may be used in other applications, for example imprint lithography.

While specific embodiments of the invention have been described above, it will be appreciated that the invention may be practiced otherwise than as described. The descriptions above are intended to be illustrative, not limiting. Thus, it will be apparent to one skilled in the art that modifications may be made to the invention as described without departing from the scope of the claims set out below.

Although specific reference is made to SXR, or SXR and EUV electromagnetic radiations, it will be appreciated that the invention, where the context allows, may be practiced with all electromagnetic radiations, includes radio waves, microwaves, infrared, (visible) light, ultraviolet, X-rays, and gamma rays. As an alternative to optical metrology methods, it has also been considered to use X-rays, optionally hard X-rays, for example radiation in a wavelength range between 0.01 nm and 10 nm, or optionally between 0.01 nm and 0.2 nm, or optionally between 0.1 nm and 0.2 nm, for metrology measurements.

The invention claimed is:

1. A method of manufacturing a reflective diffraction grating for specularly reflecting and diffracting a grazing-incidence beam of radiation incident on the grating, the grating having a periodic structure with a grating period comprising first and second substructures on either side of a sidewall facing the incident beam, the method comprising:
  determining a configuration of the first substructure to specularly reflect the incident beam, incident at a grazing angle of incidence, with respect to the grating's direction of periodicity, on grating periods including the second substructure, from the first substructure into a specularly reflected beam in a zeroth-order direction, wherein the first substructure comprises a ridge and the second substructure comprises a trench, and wherein the ridge comprises a flat top and the trench comprises a flat floor parallel to the flat top of the ridge;
  determining a fixed or varying pitch configuration of grating periods including the second substructure to diffract the incident beam from the grating periods in one or more non-zero-diffraction-order directions;
  determining, based on the grazing angle of incidence, a configuration of the second substructure and the sidewall of its grating period such that any rays of the incident beam that reflect once from the second substructure into the zeroth-order direction are obscured by the sidewall; and
  manufacturing the grating using the determined configurations of the first and second substructures and sidewall.

2. The method of claim 1, wherein the step of determining the configuration of the second substructure and the sidewall comprises determining, using a wavelength of the incident beam and a pitch of the grating periods including the second substructure, a configuration such that any rays of the incident beam that diffract from the second substructure into a selected non-zero-diffraction-order direction are obscured by the sidewall.

3. The method of claim 1, wherein the step of manufacturing the grating comprises fabricating the grating on a mirror surface, and wherein the mirror surface is curved.

4. The method of claim 1, wherein the step of determining the configuration of the second substructure and the sidewall comprises determining a shape of the trench.

5. The method of claim 1, wherein the step of determining the configuration of the second substructure and the sidewall comprises determining one or more structural parameters defining an aspect ratio of the trench, and wherein the determining one or more structural parameters defining an aspect ratio of the trench comprises satisfying the inequality $$D > \frac{W}{\frac{1}{\tan\beta} + \frac{1}{\tan\beta'}}$$

where D is a depth of the trench, W is a top width of the trench, $\beta$ is the grazing angle of incidence, and $\beta'$ is the zeroth-order direction or a non-zero-diffraction-order direction.

6. The method of claim 5, wherein at least one of:
the grating is configured with a varying top width of the trench, and wherein the depth of the trench is selected to satisfy the inequality for a largest top width of the varying top width, and
the grating is configured with the varying top width of the trench, and wherein the depth of the trench is varied to satisfy the inequality in correspondence with the varying width.

7. The method of claim 1, wherein the grating periods are configured with a grating pitch over trench width ratio of over 0.5, or over 0.7, or over 0.9.

8. The method of claim 1, wherein the radiation is emitted having a wavelength in a range of 1 nm to 100 nm, or in a range of 10 nm to 20 nm.

9. The method of claim 1, wherein the grazing angle of incidence is configured to be in a range of 1 degree to 17 degrees.

10. A method of manufacturing a reflective diffraction grating for specularly reflecting and diffracting a grazing-incidence beam of radiation incident on the grating, the grating having a periodic structure with a grating period comprising first and second substructures on either side of a sidewall facing the incident beam, the method comprising:
determining a configuration of the first substructure to specularly reflect the incident beam, incident at a grazing angle of incidence, with respect to the grating's direction of periodicity, on grating periods including the second substructure, from the first substructure into a specularly reflected beam in a zeroth-order direction;
determining a fixed or varying pitch configuration of grating periods including the second substructure to diffract the incident beam from the grating periods in one or more non-zero-diffraction-order directions;
determining, based on the grazing angle of incidence, a configuration of the second substructure and the sidewall of its grating period such that any rays of the incident beam that reflect once from the second substructure into the zeroth-order direction are obscured by the sidewall, wherein the grating periods are configured to specularly reflect a majority of the specularly reflected and diffracted radiation; and
manufacturing the grating using the determined configurations of the first and second substructures and sidewall.

11. The method of claim 10, wherein the grating periods are configured to specularly reflect over 70%, or over 90%, of the specularly reflected and diffracted radiation.

12. A reflective grating configured for specularly reflecting and diffracting a grazing-incidence beam of radiation incident on the grating, the grating comprising:
a periodic structure with a grating period comprising first and second substructures on either side of a sidewall facing the incident beam;
a first substructure configured to specularly reflect the incident beam, incident at a grazing angle of incidence, with respect to the grating's direction of periodicity, on grating periods including the second substructure, from the first substructure into a specularly reflected beam in a zeroth-order direction, wherein the first substructure comprises a ridge and the second substructure comprises a trench, and wherein the ridge comprises a flat top and the trench comprises a flat floor parallel to the flat top of the ridge; and
grating periods, including the second substructure configured with a fixed or varying pitch to diffract the incident beam from the grating periods in one or more non-zero-diffraction-order directions,
wherein the second substructure and a sidewall are configured such that any rays of the incident beam that reflect once from the second substructure in the zeroth-order direction are obscured by the sidewall, and
wherein the grating periods are configured to specularly reflect a majority of the specularly reflected and diffracted radiation.

13. The reflective diffraction grating of claim 12, wherein the second substructure and the sidewall are configured such that any rays of the incident beam that diffract from the second substructure into a selected non-zero-diffraction-order direction are obscured by the sidewall.

14. A metrology apparatus comprising:
a radiation source operable to provide a beam of radiation for illumination of a target;
a reflective diffraction grating for specularly reflecting and diffracting a grazing-incidence beam of radiation incident on the grating, the grating having a periodic structure with a grating period comprising first and second substructures on either side of a sidewall facing the incident beam, the grating comprising:
a first substructure configured to specularly reflect the beam, incident at a grazing angle of incidence, with respect to the grating's direction of periodicity, on grating periods including the second substructure, from the first substructure into a specularly reflected beam in a zeroth-order direction, wherein the first substructure comprises a ridge and the second substructure comprises a trench, and wherein the ridge comprises a flat top and the trench comprises a flat floor parallel to the flat top of the ridge; and
grating periods, including the second substructure configured with a fixed or varying pitch to diffract the beam from the grating periods in one or more non-zero-diffraction-order directions,
wherein the second substructure and the sidewall are configured such that any rays of the beam that reflect once from the second substructure in the zeroth-order direction are obscured by the sidewall, and wherein the grating periods are configured to specularly reflect a majority of the specularly reflected and diffracted radiation;
a target support for supporting the target which is configured to receive the specularly reflected beam; and
a detector configured to receive a diffracted beam diffracted from the grating periods.

* * * * *